(No Model.)
G. T. WILSON.
VEHICLE RUNNING GEAR.
No. 533,332. Patented Jan. 29, 1895.
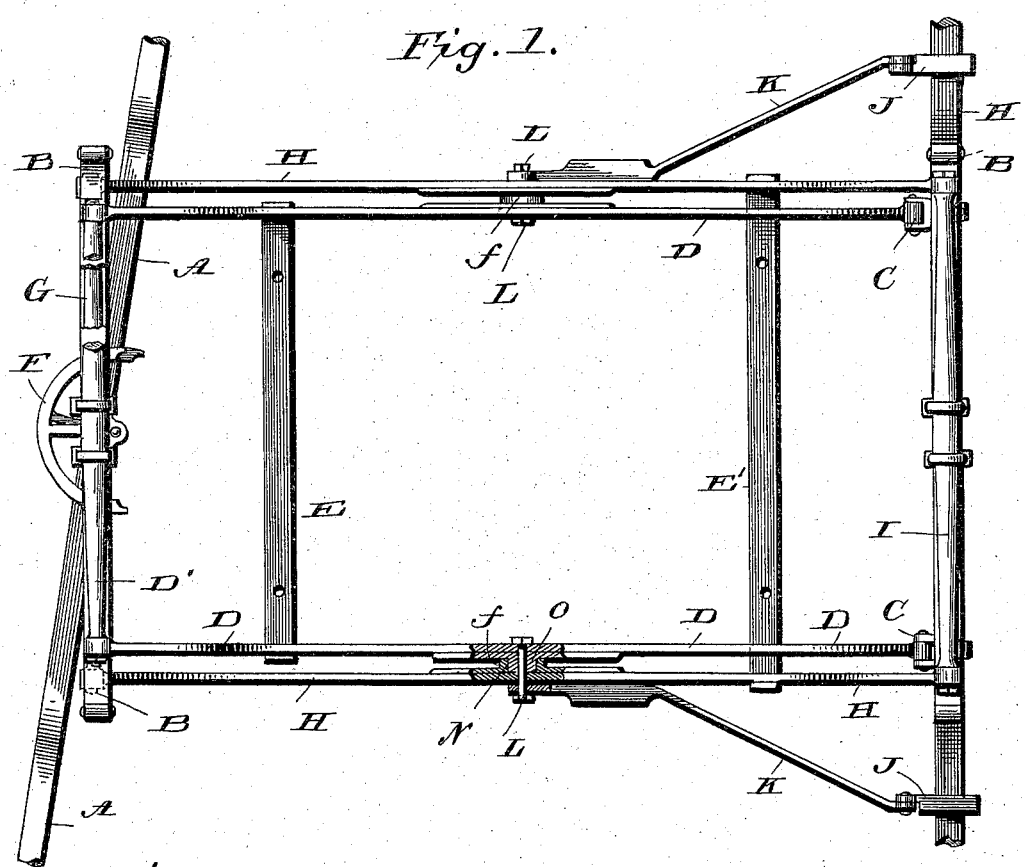
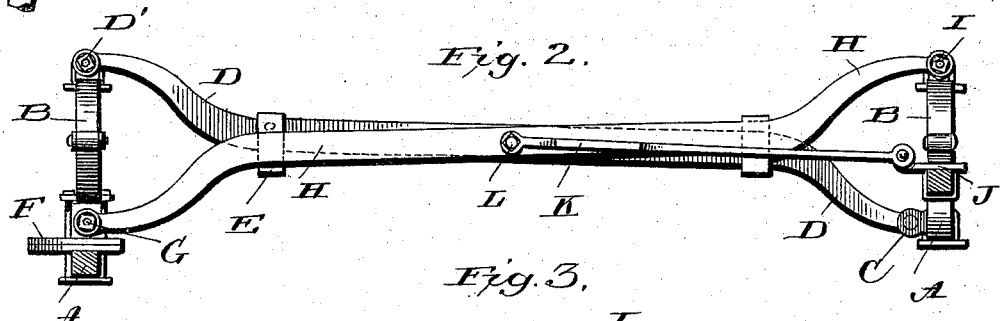
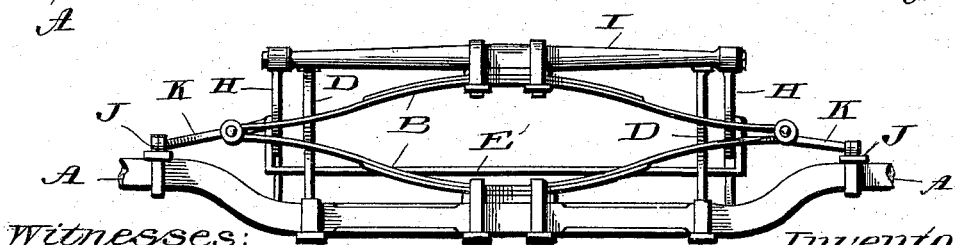
Witnesses:
L. C. Hills.
A. L. Hough.
Inventor:
George T. Wilson,
by Franklin H. Hough
Atty.
THE NORRIS PETERS CO., PHOTO-LITHO., WASHINGTON, D. C.

UNITED STATES PATENT OFFICE.

GEORGE T. WILSON, OF MOLINE, ILLINOIS.

VEHICLE RUNNING-GEAR.

SPECIFICATION forming part of Letters Patent No. 533,332, dated January 29, 1895.

Application filed September 29, 1894. Serial No. 524,483. (No model.)

*To all whom it may concern:*

Be it known that I, GEORGE T. WILSON, a citizen of the United States, residing at Moline, in the county of Rock Island and State of Illinois, have invented certain new and useful Improvements in Vehicle Running-Gear; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to an improvement in running gear for vehicles; and it consists in the combination of four oscillating bars, which form the support for the body and connect the axles, and which are connected at their centers so that the ends of one pair of the bars move in an opposite direction from the ends of the other bars, as will be more fully described hereinafter.

The objects of my invention are to entirely do away with a reach in an end or elliptic spring gear; to cause the body of the vehicle to always maintain a level position whether the weight is in the center of the body or not, or if one spring should be weaker than the other; to prevent the tipping back or forward of the body; to enable the body to be hung lower than can be done where a reach is used; and to cause the gear to settle evenly in case one spring or both should be broken.

In the accompanying drawings Figure 1 is a plan of a running gear which embodies my invention. Fig. 2 is a side elevation, and Fig. 3 is an end view.

A represents the front and A' the rear axle, and B the front, and B' the rear spring, the axles being bent or curved downward inside of their ends to any desired degree, as shown. No reach is used to connect these axles in the usual manner, but loosely connected to the rear axle by means of the clips C are the two oscillating bars D, which have their rear ends curved downward and their front ones curved upward, and their front ends loosely fastened to the bar D', clipped upon the top of the front spring. These two bars are also rigidly secured together by the cross bar E, upon which the front end of the vehicle body is secured.

Secured upon the upper half of the fifth-wheel F, is a similar bar G, to the one D', and loosely fastened to the ends of this bar are the front ends of the second pair of oscillating bars H, which have their front ends curved downward, and their rear ends curved upward, and which bars are rigidly secured together near their rear ends by the cross bar E', upon which the rear end of the body rests. The rear ends of the bars H, are loosely fastened to the ends of the bar I, which is clipped to the top of the rear spring.

Secured to the rear axle, near its outer ends, are the clips J, and pivoted to these clips are the brace rods K, which have their front ends rigidly secured to outer sides of the outer pair of bars H, by the bolts L, which pass through the two pairs of oscillating bars at or near their centers. These brace rods rise and fall at their front ends with the bars, but otherwise have no movement.

Both pairs of oscillating bars are thickened at their centers, either while being rolled, or by having other pieces applied to them, as herein shown. On the inner sides of the outer bars, are the sockets N, which project from the sides of the bars to such a distance as to separate the bars where they would rub together in their movements. The inner pair of bars have projections O, formed on their outer sides, and these projections extend into the sockets N, formed in the washer like projections formed on the outer bars. Through these projections and sockets the clamping bolts L are passed for the purpose of acting as pivots upon which both sets of bars will turn, and for the purpose of holding the bars in contact, and to cause them to rise and fall together under all circumstances. These sockets and projections prevent any strain from coming on the bolts, and hence there is no danger of their getting broken or bent.

The two pairs of oscillating bars being connected at their centers, secured together in pairs, and connected at their ends by the rods or bars D', I, they always move in perfect unison, and have no other movement than a rising and falling one. A downward pressure applied to one of the bars at any point causes all four of the bars to sink alike, and remain perfectly level. As no part of the four oscillating bars can ever get out of a level, the body secured upon their connecting cross bars can never get out of a level position whether the weight is at its center or not.

In case one spring should be weaker than the other, or one of the springs should break, the four oscillating bars would sink evenly down, and not tilt or get out of a level. As the body is secured upon the two connecting bars or rods, without the intervention of springs, the body can never tilt forward or back. No reach being used, the body can be hung lower than where a reach is used, and against which the body would strike in its up and down movement. Should both springs be broken or taken away, the carrying capacity of the vehicle would not be affected, but the body would sink down with the bars, and be supported in a horizontal position.

This gear can be manufactured more cheaply than any other first class gear how on the market, because I dispense with the reach and all the irons and bolts connected therewith; with the axle caps; all the clips and ties; and the body loops, and all the bolts used in them. The bars may be connected with the springs in many ways, but the bars must be connected at their centers.

Having thus described my invention, I claim—

1. In a running gear, the two pairs of oscillating bars, which serve both to connect the axles and to support the body, and which are connected at their centers, combined with the brace rods connected to the rear axle at one end, and to the bars at the other substantially as specified.

2. In a running gear, the axles, the springs, the rod secured to the top of the fifth wheel, and the two rods secured to the tops of the springs, combined with the two pairs of oscillating bars connected at their centers, and having their ends curved in opposite directions; one pair of rods being loosely connected with the rear axle at one end and to the rod secured to the front spring at the other end, and the other pair connected with the rod on the rear spring at one end, and to the rod secured on the fifth wheel at the other end, substantially as shown.

In testimony whereof I affix my signature in presence of two witnesses.

GEORGE T. WILSON.

Witnesses:
    JOHN WANLESS,
    J. C. GREEN.